US008351324B2

(12) United States Patent
Narasappa et al.

(10) Patent No.: US 8,351,324 B2
(45) Date of Patent: Jan. 8, 2013

(54) ANALYZING SERVICE IMPACTS ON VIRTUAL PRIVATE NETWORKS

(75) Inventors: Sumanth Narasappa, Karnataka (IN); Muthukumar Suriyanarayanan, Karnataka (IN); Venkatesh Mahalingam, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 12/790,802

(22) Filed: May 29, 2010

(65) Prior Publication Data

US 2011/0255422 A1    Oct. 20, 2011

(30) Foreign Application Priority Data

Apr. 15, 2010   (IN) .......................... 1054/CHE/2010

(51) Int. Cl.
  *G01R 31/08*   (2006.01)
  *G06F 11/00*   (2006.01)
  *G06F 15/173*  (2006.01)
  *H04L 12/26*   (2006.01)
(52) U.S. Cl. ........ 370/217; 370/237; 370/248; 370/252; 370/392; 709/238
(58) Field of Classification Search .................. 370/217, 370/225, 232, 235, 237–238, 248, 252, 254, 370/326, 351–352, 386, 389, 390, 392, 395.31, 370/395.53, 397, 401, 432; 709/238–239, 709/242
See application file for complete search history.

(56) References Cited

U.S. PATENT DOCUMENTS

| 7,865,615 | B2 * | 1/2011 | Mirtorabi et al. ............. 709/242 |
| 2005/0091482 | A1 | 4/2005 | Gray et al. |
| 2007/0008880 | A1 * | 1/2007 | Buchko et al. ................ 370/218 |
| 2007/0217419 | A1 * | 9/2007 | Vasseur ......................... 370/392 |
| 2008/0091803 | A1 * | 4/2008 | Liu ................................ 709/223 |
| 2008/0222282 | A1 | 9/2008 | Monaghan et al. |
| 2009/0129260 | A1 * | 5/2009 | Qian et al. .................... 370/216 |
| 2009/0161556 | A1 | 6/2009 | Qian et al. |
| 2010/0097943 | A1 * | 4/2010 | D'Souza et al. ............. 370/248 |
| 2010/0177632 | A1 * | 7/2010 | Tarnanen ...................... 370/225 |
| 2010/0309919 | A1 * | 12/2010 | Filsfils et al. ............. 370/395.5 |

OTHER PUBLICATIONS

Cisco Systems, Inc., "Q & A—Monitoring Center for Performance (MCP) Version 2.0", 2004, Cisco Systems, Inc., San Jose, California, 5 pages.
Cisco Systems, Inc., "Cisco Active Network Abstraction 3.6.6 MPLS User Guide", Jul. 10, 2009, Cisco Systems, Inc., San Jose, California, 100 pages.
Cisco Systems, Inc., "Cisco Active Network Abstraction MPLS User Guide", Version 3.6, Service Pack 4, Jan. 2009, Cisco Systems, Inc., San Jose, California, 88 pages.

* cited by examiner

*Primary Examiner* — Tri H Phan

(57) ABSTRACT

Methods, computer-readable media and computing systems are provided for analyzing service impacts on one or more VPNs on a computer network. A topology of each VPN may be identified. A protocol failure may be detected between routers of the computer network. It may then be determined how the VPN is affected by the protocol failure based on the identified topology and VRF information obtained from routers of the computer network.

16 Claims, 4 Drawing Sheets

ANALYZING SERVICE IMPACTS ON VIRTUAL PRIVATE NETWORKS

RELATED APPLICATIONS

Benefit is claimed under 35 U.S.C. 119(a)-(d) to Foreign application Serial No. 1054/CHE/2010 entitled "ANALYZING SERVICE IMPACTS ON VIRTUAL PRIVATE NETWORKS" by Hewlett-Packard Development Company, L.P., filed on Apr. 15, 2010, which is herein incorporated in its entirety by reference for all purposes.

BACKGROUND

Service provider networks may include computer networking infrastructure, or a "backbone," through which one or more customers may communicate and establish logical, or "virtual," networks. Data are often transmitted over such networks in suitably-sized packets, regardless of the data type. This is known as packet switching. Customers who wish to establish sustained logical networks on a service provider network may utilize virtual circuit switching, also known as connection-oriented switching. Examples of virtual circuit switching protocols include multiprotocol label switching ("MPLS") and asynchronous transfer mode ("ATM").

An exemplary service provider network 10 is shown in FIG. 1. Service provider network 10 includes core infrastructure 12 (referred to as "MPLS CORE" in FIG. 1) that includes one or more intermediate routers 14 and one or more provider edge ("PE") routers 16. Each PE router 16 may connect to one or more customer edge ("CE") routers 18. Customers who wish to utilize service provider network 10 may do so through a CE router 18.

A virtual private network ("VPN") is a logical network that is overlaid on an underlying computer network and that provides a way for users of the VPN (referred to herein as "customers") to communicate without interfering with other network traffic. A VPN may be secure, which means customers may communicate with each other over the VPN confidentially. A VPN also may be trusted, which means the VPN is used for traffic segmentation between various customer sites connected to a service provider network. Trusted VPNs may provide quality of service ("QoS") guarantees and other features to customers. A VPN customer need not be aware of the structure of the underlying service provider network. In FIG. 1, two VPNs called "VPN BLUE" and "VPN RED" are implemented on service provider network 10.

One type of VPN is a so-called "Layer 3" VPN ("L3VPN"). Two exemplary L3VPNs, BLUE VPN and RED VPN, can be seen in FIG. 1 by observing that BLUE VPN and RED VPN sites are shown connected to the service provider network via the CE routers. These VPNs may be implemented using various technologies or combinations thereof, including but not limited to MPLS, the Border Gateway Protocol (BGP") and Multiprotocol BGP ("MP-BGP"), which is an extension of BGP. PE routers may exchange VPN route prefixes using BGP. A PE router may identify as peers other PE routers with which the PE router exchanges VPN route prefixes.

Total failure of a network element (e.g., loss of power, hardware failure) may not be detectable until after-the-fact, which may delay significantly a determination of the failure's effect on services of a VPN. Sometimes, however, a network element may not experience total failure, but a software communication process on the element may experience failure that nonetheless affects VPNs and VPN services.

For example, a BGP communication process executing on a PE router may experience a failure. Such software failure may have various causes, such as buffer overflow or insufficient memory. Although the PE router is still up and running, VPN sites connected to the PE router, including CE routers, may experience degradation in performance or even total loss of connectivity. Without being able to detect such a protocol failure, a network administrator may have difficulty diagnosing a root cause of the failure or responding to the problem quickly enough to avoid customer complaints.

DETAILED DESCRIPTION

Methods, computer-readable storage media and computing systems are provided for analyzing service impacts on VPN networks due to protocol failures. Routing information, such as virtual route forwarding ("VRF") information, may be obtained from routers of a service provider network to identify topologies of VPNs that are deployed on the service provider network. Routers of the network and connections between the routers may be monitored for communication protocol failures. When a protocol failure is detected, VPNs that are or will be affected may be identified, and an affect of the protocol failure on each identified VPN may be determined based on information such as a topology of each VPN.

Figure 1:
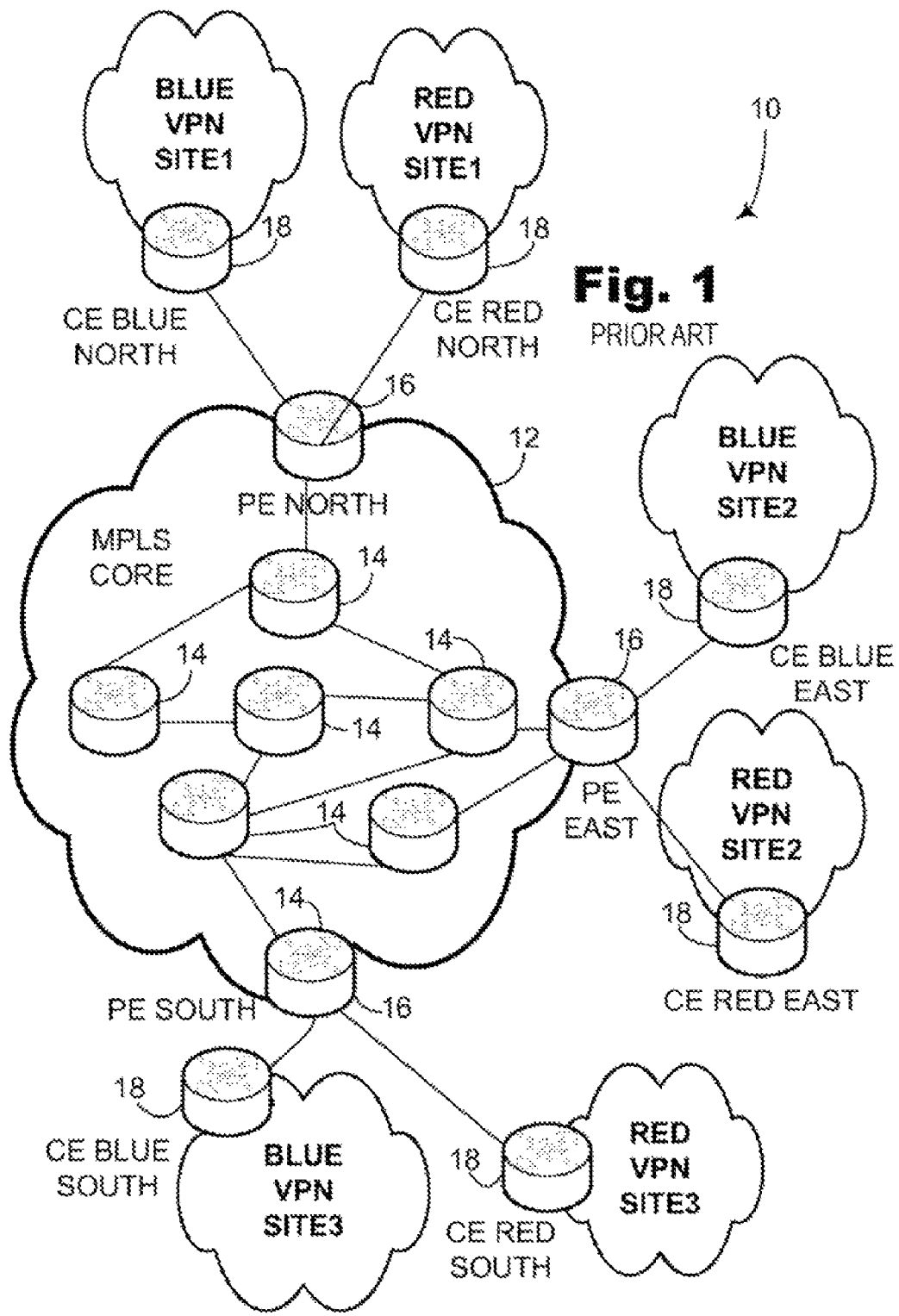
FIG. 1 depicts an exemplary provider computer network through which multiple customer sites communicate over one or more VPNs, according to an embodiment of the invention.
Figure 2:
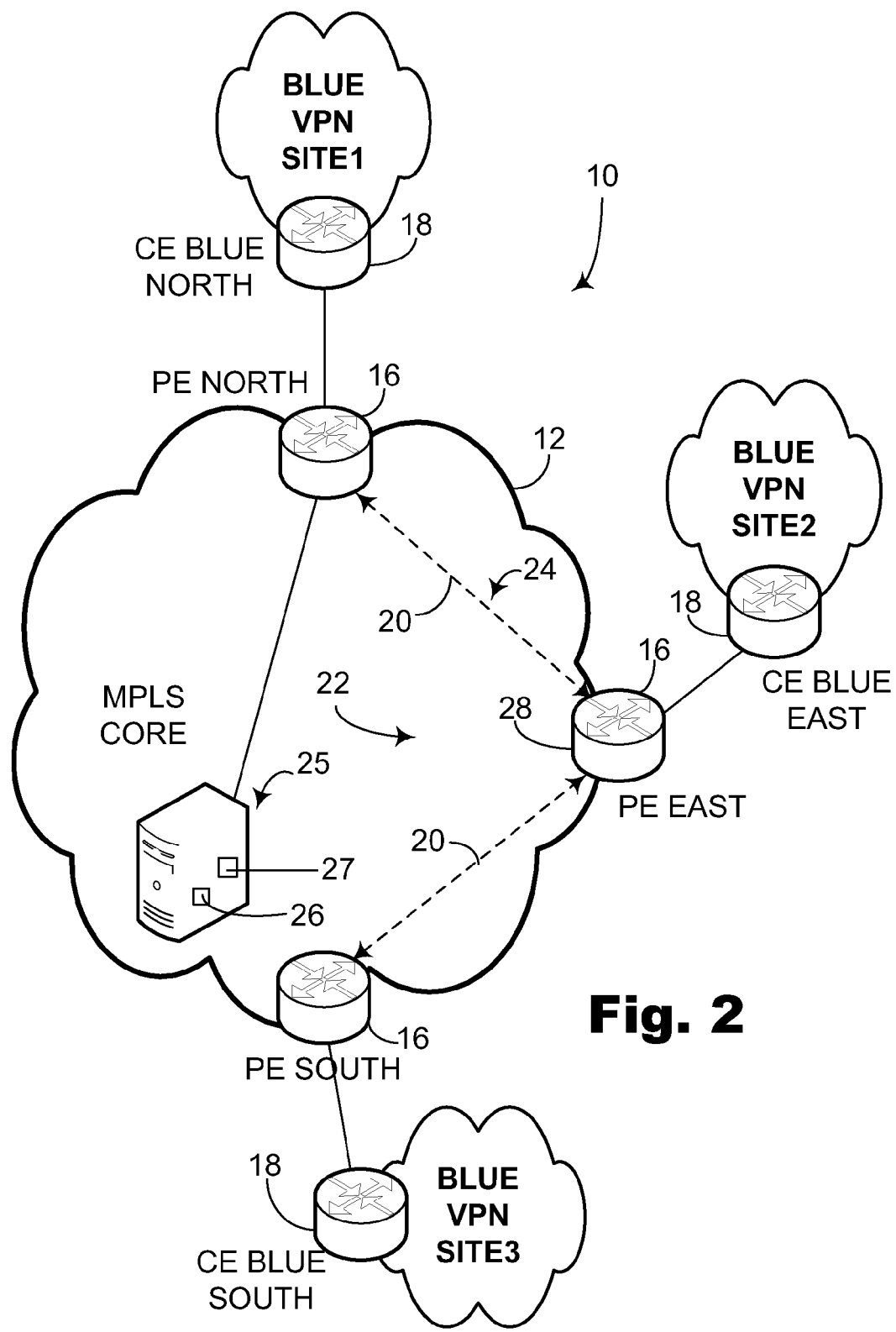
FIG. 2 depicts the exemplary provider computer network of FIG. 1, except that intermediate routers have been removed and virtual connections between PE routers for a particular VPN are shown as forming a hub-and-spoke topology, according to an embodiment of the invention.

FIG. 2 depicts the exemplary service provider network 10 of FIG. 1, except that intermediate routers 14 of FIG. 1 have been removed and virtual connections 20 between PE routers 16 for the BLUE VPN 22 are shown forming a hub-and-spoke topology 24.

Figure 3:
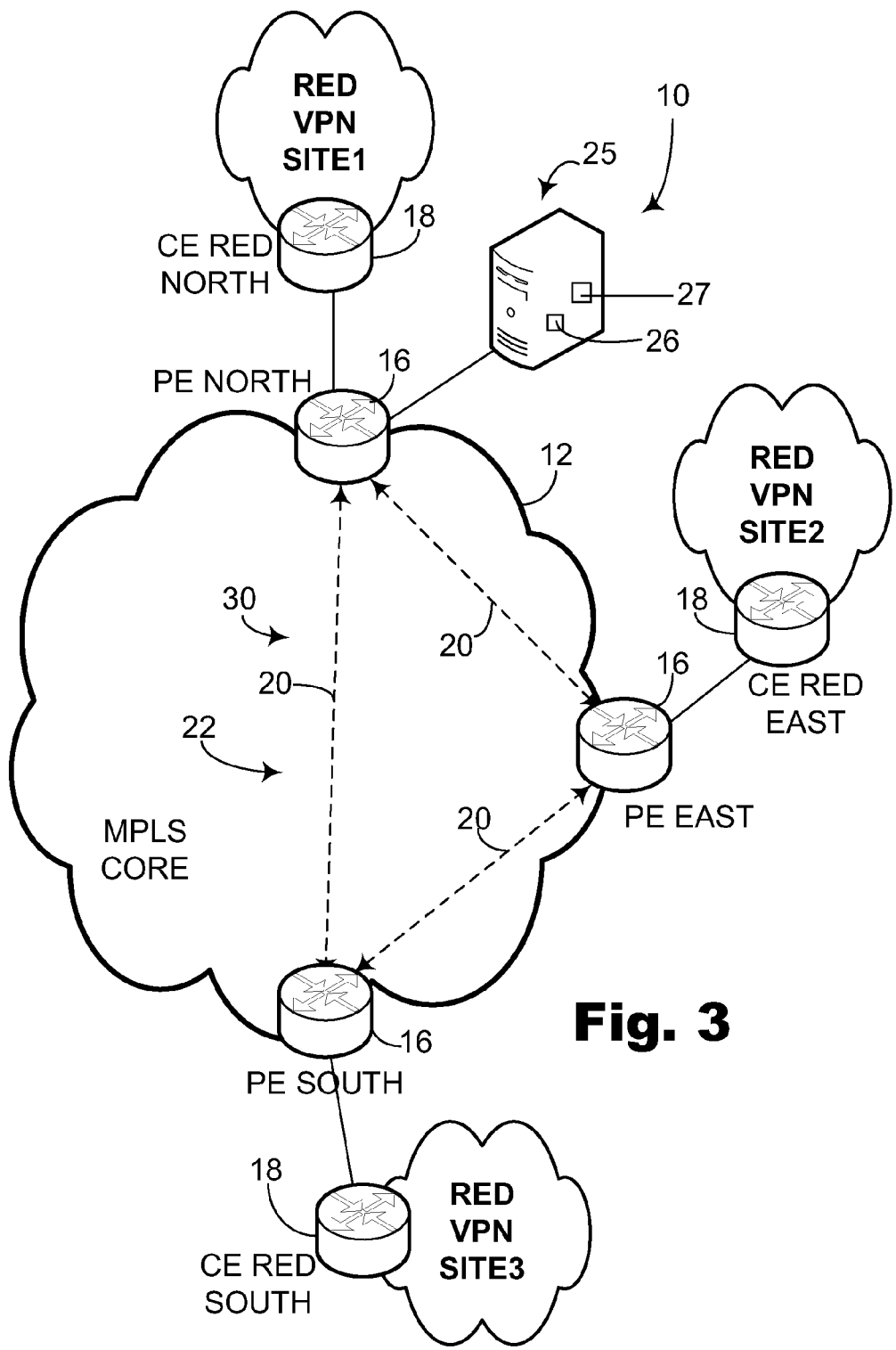
FIG. 3 depicts the exemplary provider computer network of FIG. 1, except that intermediate routers have been removed and virtual connections between PE routers for a particular VPN are shown as forming a mesh topology, according to an embodiment of the invention.

A computing system 25 may be in network communication with one or more entities that form part of service provider network 10 to analyze service impacts on VPN networks due to protocol failures. Computing system 25 may include a processor 26 and memory 27 with instructions that cause processor 26 to analyze service impacts on VPN networks due to protocol failures. These instructions may be delivered to and/or installed onto computing system 25 from computer-readable media such as one or more compact discs, one or more DVDs, one or more USB jump drives, or memory of another computer system that is in network communication with computing system 25. Although computing system 25 is shown as part of the core infrastructure 12 in FIG. 2, this is not meant to be limiting, and computing system 25 may reside outside of the core infrastructure (e.g., as shown in FIG. 3). Moreover, computing system 25 may come in various forms, including but not limited to a desktop computer system, a laptop computer, a server to which other computer systems may interact, a mobile device (e.g., smart phones), and so forth.

When it comes to communications between BLUE VPN SITE1 and BLUE VPN SITE 3, PE router 16 labeled PE EAST functions as the hub 28. PE router 16 labeled PE SOUTH and PE router 16 labeled PE NORTH are spokes. Accordingly, if PE router 16 labeled PE EAST were to experience a protocol failure or otherwise become inoperative, BLUE VPN SITES 1 and 3 would not be able to communicate because CE router 18 labeled CE BLUE SOUTH and CE router 18 labeled CE BLUE NORTH would lose all connectivity with each other.

FIG. 3 depicts the exemplary provider computer network 10 of FIG. 1, except that intermediate routers 14 of FIG. 1 have been removed and virtual connections 20 between PE routers 16 for a particular VPN 22 are shown forming a full mesh topology 30. In this example, no PE router 16 serves as a hub (28 in FIG. 2). If PE router 16 labeled PE EAST were to experience a protocol failure or otherwise become inoperative, RED VPN SITES 1 and 3 would still be able to communicate with each other because CE router 18 labeled CE RED SOUTH and CE router 18 labeled CE RED NORTH would still have connectivity, albeit likely with degradation in performance.

Figure 4:
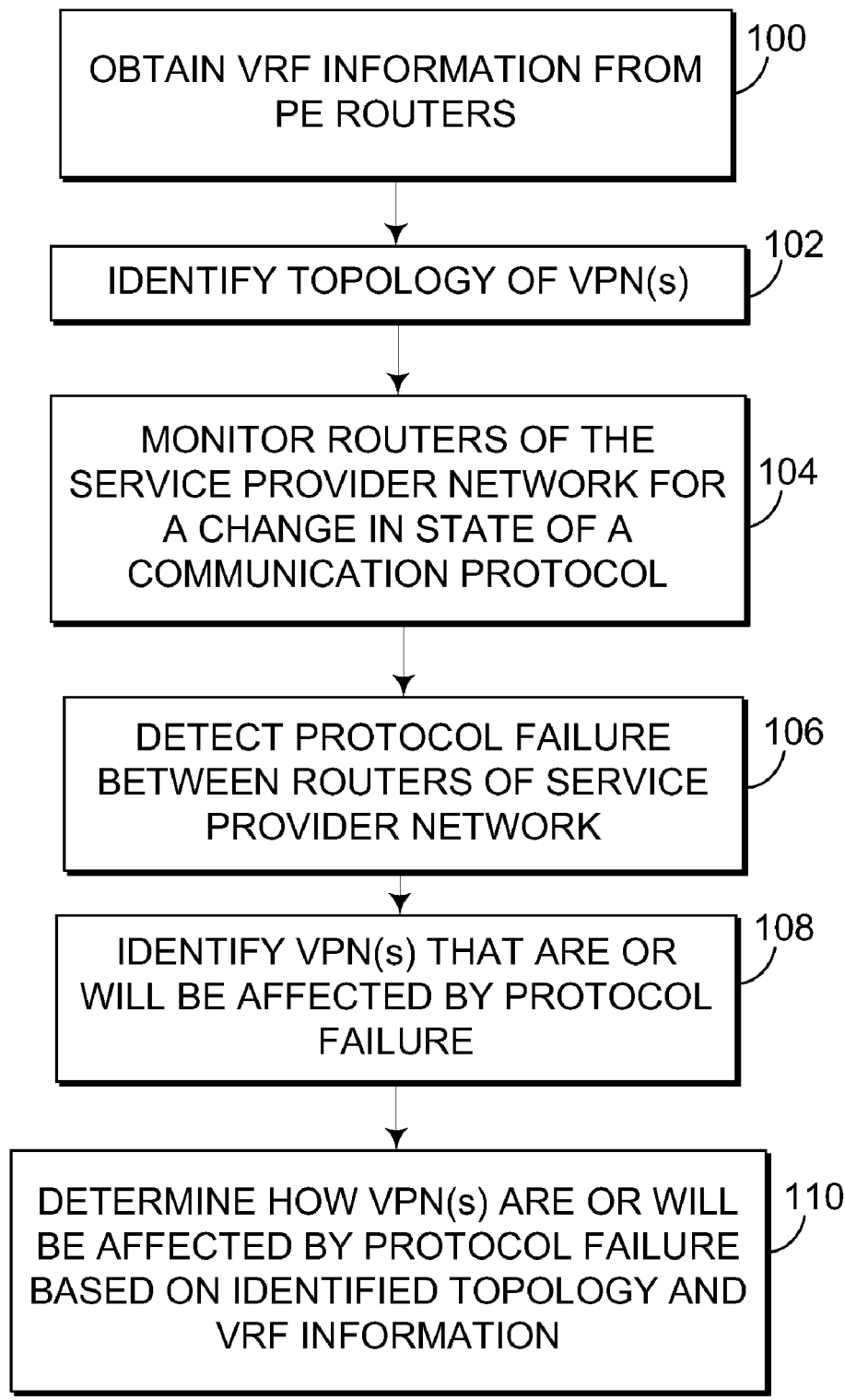
FIG. 4 depicts an exemplary method of analyzing service impact on one or more VPNs due to a protocol failure, according to an embodiment of the invention.

FIG. 4 depicts an exemplary method of analyzing service impacts on one or more VPNs due to communication protocol failure between routers of a service provider network. Although the steps are shown in a particular order, this is not meant to be limiting. The sequence of steps may be altered and one or more steps may be added or removed. These steps may be executed by one or more processors of one or more computing systems, such as computing system 25. In some embodiments, computing system 25 hosts a network management system ("NMS").

In step 100, VRF information is obtained from PE routers of the service provider network. This step may be performed when elements of a service provider network are being discovered initially by a NMS using the simple network management protocol ("SNMP"). For example, a BGP identifier associated with each PE router, as well as VRF information of each PE router, may be discovered and stored in a location accessible to a NMS. Each BGP identifier also may be a unique identifier in a local autonomous system ("AS"). An identifier associated with the local AS also may be stored by the NMS during the discovery process. A combination of a BGP identifier of a router and the local AS number can be used to uniquely identify the router on the service provider network.

Returning to FIG. 4, in step 102, a topology of each VPN that is implemented on the service provider network may be identified. A NMS may identify a topology of one or more VPNs that are implemented on the service provider network using the VRF information obtained in step 100. For example, the BLUE and RED VPNs 22 in FIG. 1 would be identified as a hub-and-spoke topology and a mesh topology, respectively, as shown in FIGS. 2 and 3. In some embodiments, a topology may be identified as a composite or "hybrid" topology with elements of both mesh and hub-and-spoke topologies.

In step 104, routers of the service provider network may be monitored for changes in state of a communication protocol. For example, a NMS may be notified if a BGP finite state machine on a particular router experiences a change from a higher state to a lower state in a session with a BGP peer. In some embodiments, the NMS is configured to obtain management information base ("MIB") data from routers that correspond to BGP states. Examples of BGP states and their corresponding MIB values are, from lowest to highest:

| MIB Value | BGP Peer State |
|---|---|
| 1 | IDLE |
| 2 | CONNECT |
| 3 | ACTIVE |
| 4 | OPENSENT |
| 5 | OPENCONFIRM |
| 6 | ESTABLISHED |

When a backward transition in BGP finite state machine is detected on a PE router, the NMS may identify the peer PE router at the other end of the connection as being inoperative.

There are a number of ways of monitoring routers of the computer network. One is a trap-driven method. Each router on the computer network may be configured to send out a trap message whenever the router experiences a change in state of a communication session with another router. For example, a PE router may be configured to send a BGP trap to a NMS using SNMP when a BGP state machine on the PE router experiences a backward transition. In some embodiments, PE routers may configured to send traps to the NMS both when they transition backwards and when they transition forward to an established state, so that the NMS may learn both when a BGP protocol fails and when it is up and running again. Using SNMP to exchange such communications avoids the need for packet sniffing.

Another way of monitoring routers of the computer is a polling-based method. A computing system in communication with the computer network, such as a NMS, may poll each router on the computer network, particularly PE routers, to determine whether any router has experienced a state change in a communication protocol. For example, a NMS may poll each PE router of a service provider network at regular and/or predefined intervals (e.g., every minute) in order to determine whether the routers have experienced backward transitions in their BGP state machines. As with traps, polling messages may be exchanged using SNMP.

Some embodiments utilize a combination of traps and polling to monitor routers on a service provider network. For example, a trap may be used to trigger polling of a PE router that has signaled a change in state in its BGP finite state machine.

Returning to FIG. 4, in step 106, a protocol failure may be detected between routers of the service provider network. Protocol failure may be detected where a trap is received that indicates that a PE router has lost a BGP connection with a BGP peer. Additionally or alternatively, protocol failure may be detected where periodic polling indicates that a PE router has lost a BGP connection with a BGP peer.

In some embodiments, a NMS does not determine that a protocol failure has occurred until it receives multiple notices (via traps or polling) from one or more PE routers indicating that a communication protocol has experienced a change in state. This may reduce false notices of protocol failure or notices of very brief and insignificant protocol failures.

For example, a first PE router may first be identified as being inoperative where the first PE router is a BGP peer of a second PE router that has experienced a change from a higher state to a lower state in its BGP finite state machine. Next, it may be confirmed that the first PE router is inoperative where the first router is a BGP peer of a third PE router that has experienced a change from a higher state to a lower state in its BGP finite state machine. In addition to avoiding false notices and notices of brief or insignificant failures, identifying multiple PE routers that have experienced changes in BGP state may be helpful in making other determinations, such as how a VPN will be affected by a protocol failure or identifying a root cause of a problem.

Whether traps, polling or a combination of the two are used, once a protocol failure is detected, the NMS may use information it obtained in previous steps to produce list of PE routers between which there is a BGP peer loss.

In step 108, one or more VPN(s) may be identified that will be affected by the protocol failure. This step may include using the VRF information obtained in step 100 and the topology identified in step 102 to infer the VRFs that are common to all affected PE routers. With this information it can be determined which VPNs are going to be affected by the protocol failure.

In step 110, it may be determined how each VPN identified in step 108 will be affected by the protocol failure based on each VPN's topology. As noted above, if a VPN has a hub-and-spoke topology, then at least some sites of the VPN 22 may experience a complete loss of connectivity. By contrast, if a VPN has a mesh topology, then at least some sites will likely experience a degradation of service, but no sites are likely to experience a complete loss of connectivity. In embodiments capable of identifying topologies that are hybrids of hub-and-spoke and mesh, whether connectivity will be lost may depend on the PE router that goes offline and whether it functions as a hub relative to other PE routers.

Returning to an earlier example, and referring to FIG. 2, assume the PE router 16 labeled PE EAST experiences a BGP protocol failure (e.g., its BGP process crashes due to buffer overflow). The PE routers 16 labeled PE NORTH and PE SOUTH both may experience a downward transition in their BGP finite state machines for their respective connections with the PE router 16 labeled PE EAST. The NORTH and SOUTH PE routers 16 may notify a NMS (via traps, responses to polling or a combination of the two) that they have a BGP peer down. The NMS may use VRF information it collected (e.g., in step 100 of FIG. 4) to identify BLUE VPN 22 as a VPN that will be affected (step 108). The NMS may then review the topology of BLUE VPN 22 that it identified in step 102 to determine that BLUE VPN 22 has a hub-and-spoke topology 24. The NMS may then determine that BLUE VPN SITE1 will lose all connectivity with BLUE VPN SITE3 that is connected to the CE router 18 labeled CE BLUE SOUTH. In fact, because PE router 16 labeled PE EAST is the hub 28 of BLUE VPN 22, its VRF information is now completely unavailable, and BLUE VPN 22 may become entirely inoperative.

In contrast to BLUE VPN 22 of FIG. 2, RED VPN of FIG. 3 has a mesh topology 30. Accordingly, the NMS may determine that RED VPN SITE1, connected to CE router 18 labeled CE RED NORTH, will experience degradation in performance when communicating with RED VPN SITE3, which is connected to CE router 18 labeled CE RED SOUTH.

Service impact incidents may be generated to indicate what impact a protocol failure is going to have on a VPN. For example, a service impact incident with severity 'WARNING' may be generated for each VPN with a mesh topology that is affected by a protocol failure, to indicate a potential degradation in performance. In cases where an affected VPN has a hub-and-spoke topology and the hub is down or otherwise inoperative, an incident with severity 'CRITICAL' may be generated, to indicate that a complete loss of connectivity is imminent. These service impact incidents may enable operators of an NMS to quickly and proactively troubleshoot and identify the services that are impacted.

There may be various root causes of protocol failures and resulting service impacts on one or more VPNs. One example described above is where a PE router experiences a BGP protocol failure, due to buffer overflow, for example. Another example is where a PE router experiences total failure. In either case, BGP peers of that PE router may indicate BGP peer down (via traps or polling), and a NMS operator may be able to respond quickly to the problem.

Another possible root cause of protocol failure is a disruption between two PE routers that disables communication between them. Examples include a downed link (e.g., severed cable) or a malfunctioning intermediate network node (e.g., router down). In such instances, both PE routers may then experience a backward transition in their respective BGP state machines with each other. If there do not appear to be any PE routers that are experiencing protocol failure, which could be determined if traps or polling results are received from all PE routers of a service provider network, then an NMS may determine that a link or intermediate node (e.g., intermediate router 14 in FIG. 1) is down between PE routers.

In networks where routing information is exported from CE routers to PE routers via eBGP, the PE routers and CE routers form BGP peers. The discovery of BGP peers between PE routers and CE routers may be similar to the discovery described above. An NMS may have access to CE routers and may query the CE routers via SNMP. BGP peer loss between PE routers and CE routers may be detected using similar steps as those described above.

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A method of analyzing service impact on a virtual private network (VPN) due to protocol failure on a computer network, comprising:
    identifying a topology of the VPN;
    monitoring routers of the computer network for a change in state of a communication protocol from a higher state to a lower state in a border gateway protocol (BGP) finite state machine;
    detecting a protocol failure between routers of the computer network; and
    determining how the VPN is affected by the protocol failure based on the identified topology and virtual route forwarding (VRF) information obtained from routers of the computer network.

2. The method of claim 1, comprising identifying a first provider edge (PE) router as being inoperative where the first PE router is a BGP peer of a second PE router that has experienced a change from a higher state to a lower state in its BGP finite state machine.

3. The method of claim 2, comprising confirming that the first PE router is inoperative where the first router is a BGP peer of a third PE router that has experienced a change from a higher state to a lower state in its BGP finite state machine.

4. The method of claim 1, wherein monitoring the routers includes receiving a trap from a router that experiences a change in state in a communication session with another router.

5. The method of claim 1, wherein monitoring the routers includes polling routers for a change in state in a communication session with another router.

6. The method of claim 1, wherein identifying a topology of the VPN includes determining whether the VPN has a mesh topology or a hub-and-spoke topology.

7. The method of claim 6, comprising determining that the VPN has lost or will lose all connectivity to a particular site where the VPN has a hub-and-spoke topology.

8. The method of claim 6, comprising determining that the VPN has experienced or will experience degradation in service to a particular site where the VPN has a mesh topology.

9. A non-transitory computer-readable storage medium having computer-executable instructions stored thereon for analyzing service impact on virtual private networks (VPNs), the instructions causing a computer to:
   monitor routers of the computer network for a change in state of a communication protocol from a higher state to a lower state in a border gateway protocol (BGP) finite state machine;
   detect a protocol failure between routers of a computer network;
   identify a VPN that is affected by the protocol failure; and
   determine whether the VPN will experience performance degradation or lost of connectivity based on a topology of the VPN.

10. The computer-readable storage medium of claim 9, including computer-executable instructions to determine whether the VPN will experience performance degradation or lost of connectivity based on virtual route forwarding (VRF) information obtained from routers of the computer network.

11. The computer-readable storage medium of claim 9, wherein to monitor the routers includes to receive a trap from a router that experiences a change in state in a communication session with another router.

12. The computer-readable storage medium of claim 9, including computer-executable instructions to identify a first router as being inoperative where the first router is a BGP peer of a second router that has experienced a change from a higher state to a lower state in its BGP finite state machine.

13. The computer-readable storage medium of claim 12, including computer-executable instructions to determine whether the first router is a provider edge (PE) router or a customer edge (CE) router based on the topology of the VPN.

14. A computing system for analyzing service impact on a virtual private network (VPN) due to protocol failure on a computer network, comprising:
   a processor; and
   memory containing instructions for causing the processor to:
      identify a topology of the VPN;
      identify a first router as being inoperative where the first router is a border gateway protocol (BGP) peer of a second router that has experienced a change from a higher state to a lower state in its BGP finite state machine; and
      determine how the VPN is affected by the inoperability of the first router based on the identified topology.

15. The computing system of claim 14, wherein the memory includes instructions to cause the processor to confirm that the first router is inoperative where the first router is a BGP peer of a third router that has experienced a change from a higher state to a lower state in its BGP finite state machine.

16. The computing system of claim 14, wherein the memory includes instructions to cause the processor to determine whether the first router is a customer edge (CE) router or a provider edge (PE) router based on the identified topology.

* * * * *